United States Patent
Wu et al.

(10) Patent No.: US 10,611,405 B2
(45) Date of Patent: Apr. 7, 2020

(54) UNMANNED TRANSPORTING ROBOTS AND THE CHASSIS THEREOF

(71) Applicant: Zhejiang Guozi Robot Technology Co., Ltd., Hangzhou, Zhejiang (CN)

(72) Inventors: Weifeng Wu, Zhejiang (CN); Wangdong Wu, Zhejiang (CN); Chengkang Rao, Zhejiang (CN); Zhenhua Shen, Zhejiang (CN); Yikun Tao, Zhejiang (CN); Hongbo Zheng, Zhejiang (CN); Lingfen Zhu, Zhejiang (CN); Xia Wang, Zhejiang (CN); Xinfeng Du, Zhejiang (CN)

(73) Assignee: ZHEJIANG GUOZI ROBOT TECHNOLOGY CO., LTD. (CN)

( * ) Notice: Subject to any disclaimer, the term of this patent is extended or adjusted under 35 U.S.C. 154(b) by 40 days.

(21) Appl. No.: 15/305,501

(22) PCT Filed: Oct. 8, 2016

(86) PCT No.: PCT/CN2016/101486
§ 371 (c)(1),
(2) Date: Jun. 6, 2017

(87) PCT Pub. No.: WO2018/064808
PCT Pub. Date: Apr. 12, 2018

(65) Prior Publication Data
US 2018/0201311 A1 Jul. 19, 2018

(51) Int. Cl.
*B62D 9/00* (2006.01)
*B62D 61/10* (2006.01)

(52) U.S. Cl.
CPC ............ *B62D 9/002* (2013.01); *B62D 61/10* (2013.01); *Y10S 901/01* (2013.01)

(58) Field of Classification Search
CPC ....................................................... B62D 9/002
(Continued)

(56) References Cited

U.S. PATENT DOCUMENTS 4,221,273 A * 9/1980 Finden ..................... A61G 5/04
180/23
5,456,332 A * 10/1995 Borenstein ........... B60K 17/358
180/167

(Continued)

FOREIGN PATENT DOCUMENTS

| CN | 102673676 A | 4/2012 |
| CN | 102923208 A | 11/2012 |

(Continued)

*Primary Examiner* — Jacob D Knutson
(74) *Attorney, Agent, or Firm* — McDonnell Boehnen Hulbert & Berghoff LLP

(57) ABSTRACT

The present invention discloses an unmanned transporting robot and the chassis thereof, the chassis includes a floor, a drive unit and a follow unit; the follow unit is used to bear the loads of the chassis and the payload, and includes a plurality of follow components which are arranged on the floor to enable the floor to move smoothly (i. e. without the occurrence of tilting or vibration); the drive unit includes a first drive component and a second drive component which are located symmetrically on both ends of the floor. The present invention also discloses an unmanned transporting robot including the above-described chassis. The chassis of the unmanned transporting robot according to the present invention has the advantages of a compress structure, a small size and a high loading-bearing capacity.

14 Claims, 2 Drawing Sheets

(58) Field of Classification Search
USPC .......................................................... 180/6.5
See application file for complete search history.

(56) References Cited

U.S. PATENT DOCUMENTS

| | | | | |
|---|---|---|---|---|
| 5,535,843 | A * | 7/1996 | Takeda | B25J 5/007 180/200 |
| 6,443,543 | B1 * | 9/2002 | Chiang | A47B 21/00 180/65.1 |
| 7,398,842 | B2 * | 7/2008 | Fontecchio | B62D 11/003 180/242 |
| 7,975,790 | B2 * | 7/2011 | Kim | B60G 3/01 180/65.51 |
| 8,855,813 | B2 * | 10/2014 | Ziegler | A47L 5/14 700/245 |
| 2001/0011611 | A1 * | 8/2001 | Poerschmann | B60K 1/02 180/65.1 |
| 2004/0262060 | A1 * | 12/2004 | Kim | A47L 9/009 180/65.51 |
| 2011/0168474 | A1 | 7/2011 | Checketts et al. | |
| 2012/0228042 | A1 * | 9/2012 | Jost | A61G 5/045 180/65.51 |

FOREIGN PATENT DOCUMENTS

| | | |
|---|---|---|
| CN | 103448830 A | 12/2013 |
| CN | 104015836 A | 9/2014 |
| CN | 204956703 U | 9/2015 |
| CN | 105172562 A | 12/2015 |
| CN | 105752888 A | 5/2016 |
| CN | 105923069 A | 5/2016 |
| CN | 105947506 A | 9/2016 |
| CN | 206107324 U | 4/2017 |
| DE | 102013019726 A1 | 5/2015 |

* cited by examiner

UNMANNED TRANSPORTING ROBOTS AND THE CHASSIS THEREOF

FIELD OF THE INVENTION

The present invention relates to a warehouse logistics auxiliary device and, in particular, to unmanned transporting robots and the chassis thereof.

DESCRIPTION OF THE PRIOR ART

The unmanned transporting robot, also known as an automated guided vehicle (AGV), is an equipment for use in the field of automated material transporting, which has the advantages of high automation, flexible application, safety and reliability, high efficiency and convenient maintenance, and thus it is widely used in logistics transportation places such as automobile manufacturing industry, food industry, tobacco industry and construction machinery industry, and it has some impact on the public service places such as airports, hospitals and office buildings. These advantages also make the unmanned transporting robot a critical equipment in modern logistics systems and consequently one of important members in the "machine substitution for human labor" project.

As a major portion of the unmanned transporting robot, the ratio of the size to load-bearing capacity of the chassis is an important index to evaluate the performance of the chassis. However, the load-bearing capacity of the chassis of the existing unmanned transporting robot is insufficient due to size limitation.

SUMMARY OF THE INVENTION

In view of the above-mentioned drawbacks of the prior art, the technical problem to be solved by the present invention is to provide a chassis of an unmanned transporting robot with a compress structure, a small size and a high loading-bearing capacity.

In order to achieve the above-described object, the present invention provides a chassis of an unmanned transporting robot, which includes a floor, a drive unit and a follow unit; the follow unit is used to bear the loads of the chassis and the payload, and includes a plurality of follow components which are arranged on the floor to enable the floor to move smoothly (i. e. without the occurrence of tilting or vibration); the drive unit includes a first drive component and a second drive component which are located symmetrically on both ends of the floor.

Further, the plurality of follow components include a first follow component, a second follow component, a third follow component and a fourth follow component which are respectively disposed in sequence at four corners of the floor along the circumference of the floor.

Further, the first drive component is disposed between the first follow component and the second follow component, and the second drive component is disposed between the third follow component and the fourth follow component, the forward-reverse, turning, and pivot spinning of the chassis is accomplished by the differential speed between the first drive component and the second drive component.

Further, the first follow component, the second follow component, the third follow component and the fourth follow component each include a swivel caster wheel which is used to bear and/or prevent the chassis from tipping over.

Further, the first drive component and the second drive component each include a drive wheel, a compressing module, a guiding module and a gear motor module; the gear motor module is connected to the drive wheel; the drive wheel and the gear motor module are connected through the guiding module to the floor, and may slide perpendicularly to the ground along the guiding module; the compressing module is disposed on the guiding module for providing a positive pressure for the drive wheel.

Further, the gear motor module is a right-angle gear motor module, the axis of the output end of which is collinear with the axis of rotation of the drive wheel, and major part of the back end of the right-angle gear motor module is perpendicular to the axis of the output end thereof and is mounted at an angle to the floor so as to avoid interference with the swivel caster wheel.

Further, the guiding module is a combination of a linear bearing and a guide rod, or is a linear guide rail.

Further, the drive wheel has a contact point with the ground, and the contact point is coplanar with the sliding direction of the guiding module.

Further, the compressing module is a spring.

Further, the drive wheel is a plastic wheel, which is used for increasing the ground friction.

The drive wheel of the chassis of an unmanned transporting robot according to the present invention compresses the ground through the compressing module, the positive pressure to the ground of the drive wheel is provided by the compressing module, the magnitude of the positive pressure does not change with the load of the chassis; the load of the chassis is borne by the swivel caster wheel.

The forward or reverse of the chassis of an unmanned transporting robot according to the present invention is accomplished by co-rotating at the same speed of the drive wheels on both ends of the floor, and the clockwise or anticlockwise pivot spinning is accomplished by counter-rotating at the same speed of the drive wheels on both ends of the floor.

Compared with the existing chassis of an unmanned transporting robot, the chassis of an unmanned transporting robot according to the present invention has the advantages of a compress structure, a small size and a high loading-bearing capacity.

The present invention also provides an unmanned transporting robot, which includes any one of the above-described chassis.

The concepts, the specific structures and the technical effects of the present invention will be further illustrated below in conjunction with the accompanying drawings, in order to fully understand the objects, features and effects of the present invention.

DETAILED DESCRIPTION OF THE PREFERRED EMBODIMENTS

Figure 1:
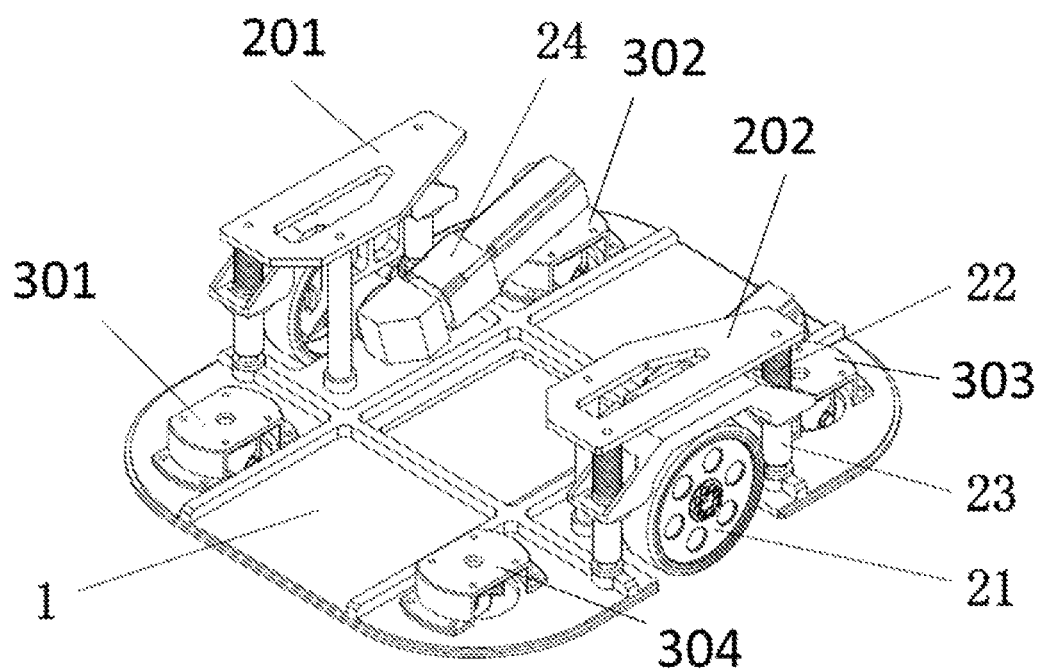
FIG. 1 is a schematic perspective view of a chassis of an unmanned transporting robot of a preferred embodiment of the present invention.
Figure 2:
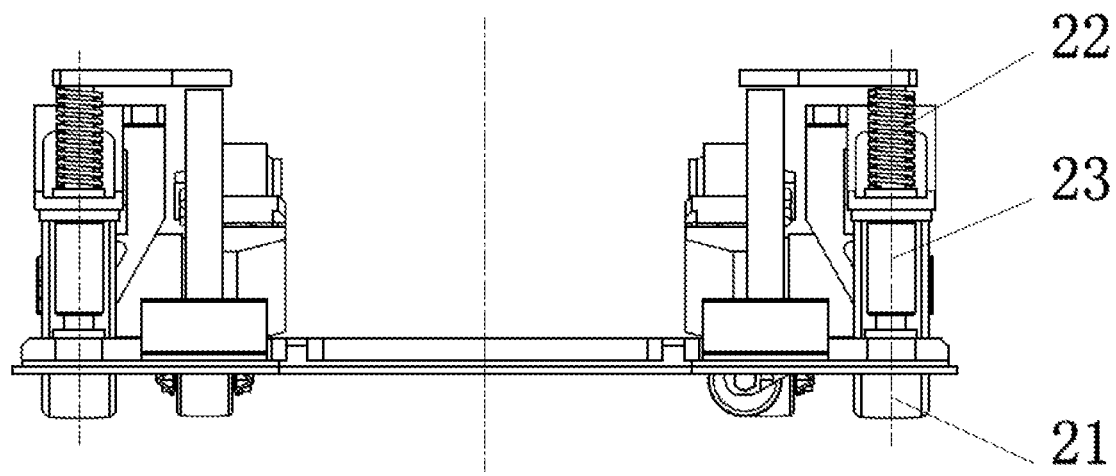
FIG. 2 is a front view of the chassis of an unmanned transporting robot of a preferred embodiment of the present invention.
Figure 3:
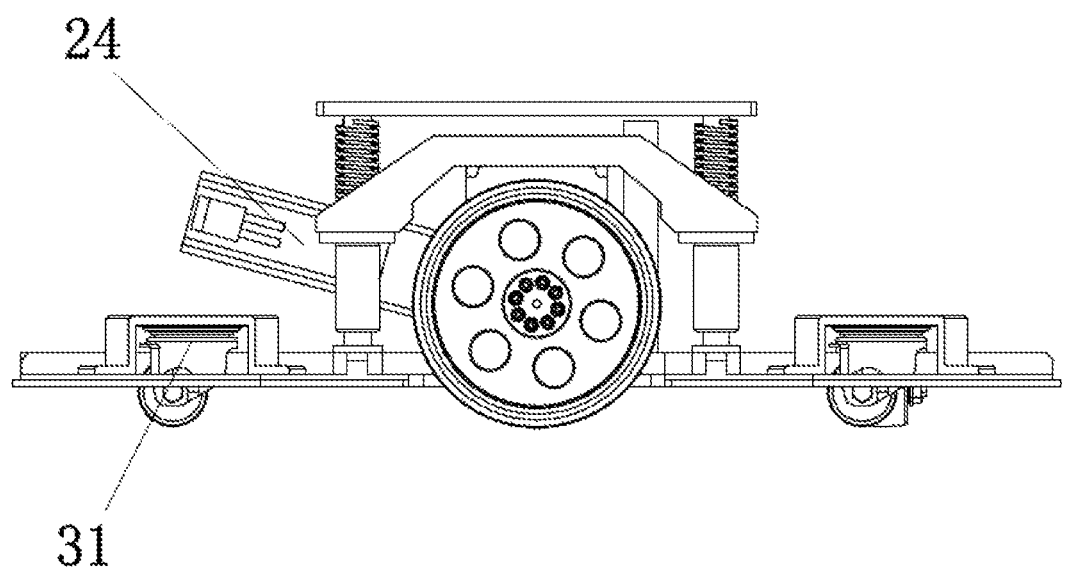
FIG. 3 is a side view of the chassis of an unmanned transporting robot of a preferred embodiment of the present invention.

As shown in FIGS. 1-3, a preferred embodiment of the present invention provides a chassis of an unmanned transporting robot, which includes a floor 1, a drive unit and a follow unit. The follow unit is used to bear the loads of the chassis and the payload, and includes a plurality of follow components which are arranged on the floor 1 to enable the floor 1 to move smoothly (i.e. without the occurrence of tilting or vibration). The plurality of follow components include a first follow component 301, a second follow component 302, a third follow component 303 and a fourth follow component 304 which are respectively disposed in sequence at four corners of the floor 1 along the circumference of the floor 1. The drive unit includes a first drive component 201 and a second drive component 202, the first drive component 201 is disposed between the first follow component 301 and the second follow component 302, and the second drive component 202 is disposed between the third follow component 303 and the fourth follow component 304, so that the first drive component 201 and the second drive component 202 are located symmetrically on both ends of the floor 1. The forward-reverse, turning, and pivot spinning of the chassis is accomplished according to the present invention by the differential speed between the first drive component 201 and the second drive component 202.

Preferably, the first follow component 301, the second follow component 302, the third follow component 303 and the fourth follow component 304 each include a swivel caster wheel 31 which is used to bear and prevent the chassis from tipping over.

Preferably, the first drive component 201 and the second drive component 202 each include a drive wheel 21, a compressing module 22, a guiding module 23 and a gear motor module. Preferably, the gear motor module is a right-angle gear motor module 24 which is connected to the drive wheel 21; the drive wheel 21 and the right-angle gear motor module 24 are connected through the guiding module 23 to the floor 1, and may slide perpendicularly to the ground along the guiding module 23; the compressing module 22 is disposed on the guiding module 23 for providing a positive pressure for the drive wheel 21. Preferably, the axis of the output end of the right-angle gear motor module 24 is collinear with the axis of rotation of the drive wheel 21, major part of the back end of the right-angle gear motor module 24 is perpendicular to the axis of the output end and is mounted at an angle to the floor 1 so as to avoid interference with the swivel caster wheel 31.

Preferably, the guiding module 23 is a combination of a linear bearing and a guide rod, or a linear guide rail.

Preferably, the drive wheel 21 has a contact point with the ground, and the contact point is coplanar with the sliding direction of the guiding module 23.

Preferably, the compressing module 22 is a spring.

Preferably, the drive wheel 21 is a plastic wheel, which is used for increasing the ground friction.

The drive wheel 21 of the chassis of an unmanned transporting robot according to the present invention compresses the ground through the compressing module 22, the positive pressure to the ground of the drive wheel 21 is provided by the compressing module 22, the magnitude of the positive pressure does not change with the load of the chassis; the load of the chassis is borne by the swivel caster wheel 31.

The forward or reverse of the chassis of an unmanned transporting robot according to the present invention is accomplished by co-rotating of the drive wheels 21 at the same speed on both ends of the floor 1, the left-turning or right-turning is accomplished by co-rotating of the drive wheels 21 at different speeds on both ends of the floor 1, and the clockwise or anticlockwise pivot spinning is accomplished by counter-rotating of the drive wheels 21 at the same speed on both ends of the floor 1.

The preferred specific embodiment of the invention has been described in detail above. It is to be understood that numerous modifications and variations can be made by those ordinary skilled in the art in accordance with the concepts of the present invention without any inventive effort.

Therefore, the technical solutions that may be derived by those skilled in the art according to the concepts of the present invention on the basis of the prior art through logical analysis, reasoning and limited experiments should be within the scope of protection defined by the claims.

The invention claimed is:

1. A chassis of an unmanned transporting robot, comprising a floor, a drive unit and a follow unit; the follow unit comprises a plurality of follow components which are arranged on the floor to enable the floor to move smoothly; the drive unit comprises a first drive component and a second drive component which are located symmetrically on both ends of the floor;
    wherein the plurality of follow components include a first follow component, a second follow component, a third follow component and a fourth follow component which are respectively disposed in sequence at four corners of the floor along the circumference of the floor;
    wherein the first follow component, the second follow component, the third follow component and the fourth follow component each include a swivel caster wheel which is used to bear or prevent the chassis from tipping over;
    wherein the first drive component and the second drive component each include a drive wheel, a compressing module, a guiding module and a gear motor module; the gear motor module is connected to the drive wheel; the drive wheel and the gear motor module are connected through the guiding module to the floor, and may slide perpendicularly to the ground along the guiding module; the compressing module is disposed on the guiding module for providing a positive pressure for the drive wheel;
    wherein the gear motor module is a right-angle gear motor module, the axis of the output end of which is collinear with the axis of rotation of the drive wheel, major part of the back end of the right-angle gear motor module is perpendicular to the axis of the output end and is mounted at an angle to the floor;
    wherein the drive wheel compresses the ground through the compressing module, a positive pressure to the ground of the drive wheel is provided by the compressing module, a magnitude of the positive pressure does not change with a load of the chassis, the load of the chassis is borne by the swivel caster wheel;
    wherein a forward or a reverse of the chassis is accomplished by co-rotating of the drive wheels at the same speed on both ends of the floor, a left-turning or a right-turning is accomplished by co-rotating of the drive wheels at different speeds on both ends of the floor, and the clockwise or anticlockwise pivot spinning is accomplished by counter-rotating of the drive wheels at the same speed on both ends of the floor.

2. The chassis of an unmanned transporting robot according to claim 1, wherein the first drive component is disposed between the first follow component and the second follow component, and the second drive component is disposed between the third follow component and the fourth follow component.

3. The chassis of an unmanned transporting robot according to claim 1, wherein the guiding module is a combination of a linear bearing and a guide rod.

4. The chassis of an unmanned transporting robot according to claim 1, wherein the guiding module is a linear guide rail.

5. The chassis of an unmanned transporting robot according to claim 1, wherein the drive wheel has a contact point with the ground, and the contact point is coplanar with the sliding direction of the guiding module.

6. The chassis of an unmanned transporting robot according to claim 1, wherein the compressing module is a spring.

7. The chassis of an unmanned transporting robot according to claim 1, wherein the drive wheel is a plastic wheel.

8. An unmanned transporting robot, comprising the chassis according to claim 1;
wherein the plurality of follow components include a first follow component, a second follow component, a third follow component and a fourth follow component which are respectively disposed in sequence at four corners of the floor along the circumference of the floor;
wherein the first follow component, the second follow component, the third follow component and the fourth follow component each include a swivel caster wheel which is used to bear or prevent or both bear and prevent the chassis from tipping over;
wherein the first drive component and the second drive component each include a drive wheel, a compressing module, a guiding module and a gear motor module; the gear motor module is connected to the drive wheel; the drive wheel and the gear motor module are connected through the guiding module to the floor, and may slide perpendicularly to the ground along the guiding module; the compressing module is disposed on the guiding module for providing a positive pressure for the drive wheel;
wherein the gear motor module is a right-angle gear motor module, the axis of the output end of which is collinear with the axis of rotation of the drive wheel, major part of the back end of the right-angle gear motor module is perpendicular to the axis of the output end and is mounted at an angle to the floor;
wherein the drive wheel compresses the ground through the compressing module, a positive pressure to the ground of the drive wheel is provided by the compressing module, a magnitude of the positive pressure does not change with a load of the chassis, the load of the chassis is borne by the swivel caster wheel;
wherein a forward or a reverse of the chassis is accomplished by co-rotating of the drive wheels at the same speed on both ends of the floor, a left-turning or a right-turning is accomplished by co-rotating of the drive wheels at different speeds on both ends of the floor, and the clockwise or anticlockwise pivot spinning is accomplished by counter-rotating of the drive wheels at the same speed on both ends of the floor.

9. The unmanned transporting robot according to claim 8, wherein the first drive component is disposed between the first follow component and the second follow component, and the second drive component is disposed between the third follow component and the fourth follow component.

10. The unmanned transporting robot according to claim 8, wherein the guiding module is a combination of a linear bearing and a guide rod.

11. The unmanned transporting robot according to claim 8, wherein the guiding module is a linear guide rail.

12. The unmanned transporting robot according to claim 8, wherein the drive wheel has a contact point with the ground, and the contact point is coplanar with the sliding direction of the guiding module.

13. The unmanned transporting robot according to claim 8, wherein the compressing module is a spring.

14. The unmanned transporting robot according to claim 8, wherein the drive wheel is a plastic wheel.

* * * * *